United States Patent [19]

Barkhuff, Jr. et al.

[11] 4,069,288
[45] Jan. 17, 1978

[54] METHOD FOR PREPARING FIRE RETARDANT MOLDING COMPOSITIONS

[75] Inventors: Raymond A. Barkhuff, Jr., Hampden; William E. Sprenkle, Jr., Wilbraham, both of Mass.

[73] Assignee: Monsanto Company, St. Louis, Mo.

[21] Appl. No.: 679,943

[22] Filed: Apr. 26, 1976

[51] Int. Cl.$^2$ .............................................. C08K 5/59
[52] U.S. Cl. ................... 264/141; 106/15 FP; 260/42.22; 260/42.44; 260/45.75 B; 260/45.95 G; 260/876 R; 264/143; 264/211; 264/349
[58] Field of Search .............. 264/211, 141, 143, 349; 260/45.95 G, 876 R, 42.44, 42.22, 45.75 B; 106/15 FP

[56] References Cited

U.S. PATENT DOCUMENTS

| | | | |
|---|---|---|---|
| 3,250,739 | 5/1966 | Sauer et al. ................... | 260/45.75 B |
| 3,516,959 | 6/1970 | Jonas .......................... | 260/DIG. 24 |
| 3,527,713 | 9/1970 | Haynes et al. ................ | 264/143 |
| 3,694,402 | 9/1972 | Essam ......................... | 264/211 |
| 3,830,889 | 8/1974 | Deets et al. .................. | 260/876 R |
| 3,833,538 | 9/1974 | Anderson ...................... | 260/42.44 |
| 3,849,369 | 11/1974 | Anderson ...................... | 260/42.22 |
| 3,852,393 | 12/1974 | Furukawa et al. ............. | 260/45.75 B |
| 3,903,037 | 9/1975 | Deets ........................... | 260/DIG. 24 |
| 3,929,722 | 12/1975 | Bak et al. ..................... | 260/876 R |

FOREIGN PATENT DOCUMENTS 2,312,804 9/1974 Germany.

*Primary Examiner*—Jeffery R. Thurlow
*Attorney, Agent, or Firm*—William J. Farrington; James C. Logomasini; Stanley M. Tarter

[57] ABSTRACT

Disclosed herein is a method for preparing fire retardant styrenic polymer molding compositions with improved impact strength which compositions contain a metal oxide and a halogenated fire retardant additive. The method comprises dispersing the metal oxide into a minor portion of the styrene polymer component using high intensity mixing and temperatures at or above the fusion temperature of the styrene polymer in order to obtain a uniform dispersion. The metal oxide-polystyrene dispersion is then blended with the other ingredients of the polyblend. The resulting blend is compounded at temperatures greater than 255° C. and then comminuted to form a molding composition.

9 Claims, No Drawings

METHOD FOR PREPARING FIRE RETARDANT MOLDING COMPOSITIONS

BACKGROUND OF THE INVENTION

1. Field of the Invention

The present invention relates to a method for incorporating metal oxide synergists into fire retardant compositions. More particularly, it relates to a method for preparing fire retardant styrenic molding compositions which contain halogen fire retardant additives and a metal oxide such as antimony oxide.

2. Description of the Prior Art

Increasing emphasis is being placed on the fire retardant properties of polymers which are used in vehicles, the building trades and consumer goods, e.g., furniture, radio and television cabinets, appliance housings, etc. Most of the polymers that are currently used in the above applications have a tendency to burn. Consequently, steps must be taken to improve fire retardant properties of these polymers in order to make them slower to ignite and slower to burn.

One approach to obtaining fire retardancy is to compound the polymer with fire retardant additives. Halogenated additives, which are used in combination with a synergist such as antimony oxide, are widely used to obtain some degree of fire retardancy.

However, there are problems associated with the additive approach. One such problem is obtaining a uniform blend of polymer and additives. Lack of homogeneity in the blend may give rise to poorer fire retardant ratings as determined by the UL-94 test. Another problem is minimizing the loss of impact strength that occurs when the polymer is formulated with the fire retardant additives.

A need exists in the art for an improved method for compounding polymers with fire retardant additives in order to provide fire retardant compositions with a high degree of homogeneity while minimizing any loss in physical properties such as impact strength.

SUMMARY OF THE INVENTION

The present invention fulfills the above needs by providing an improved method for compounding fire retardant polystyrene molding compositions, which contain a metal oxide and a fire retardant halogen additive, in order to obtain compositions with a high degree of homogeneity and good physical properties.

The improved method for preparing such fire retardant polymer compositions comprises:

A. mixing the metal oxide with a minor amount of the polystyrene component;

B. subjecting the mixture to high intensity mixing at or above the fusion temperature of the polystyrene for a time sufficient to uniformly disperse the metal oxide in the molten polystyrene;

C. comminuting the polystyrene-metal oxide mixture obtained in Step B above;

D. blending the comminuted polystyrene-metal oxide mixture with the other ingredients of the molding composition;

E. compounding the blend from (D) above at temperatures above 255° C. and below the temperature at which degradation of the blend or any component thereof occurs; and F. comminuting the compounded blend to form a molding composition.

DESCRIPTION OF THE PREFERRED EMBODIMENTS

A. Styrenic Polymer Component

The preferred styrenic polymers which are used in the present invention are polymers and copolymers of styrene with other suitable monomers such as acrylonitrile, methacrylonitrile, methylmethacrylate, butadiene and the like. Examples of these include polystyrene, styrene/acrylonitrile copolymers, acrylonitrile/butadiene/styrene copolymers, rubber modified polystyrene compositions, rubber modified styrene/acrylonitrile copolymers, rubber modified styrene/acrylonitrile/methylmethacrylate copolymers, etc.

The styrene-type monomers used to prepare the polystyrene polymers used in the present invention include styrene, alphamethylstyrene, and halogenated styrenes such as o-, p-, and m-chlorostyrenes, o-, p-, and m-bromostyrenes, etc. The amount of styrene-type monomer used in the styrene polymers of the present invention is from 30 to 100 percent by weight based on the weight of the total polymer composition.

Especially preferred styrenic polymers for use in the present invention are those high impact polystyrene (HIPS) composition which are obtained by blending polystyrene with from 1 to 12 percent, preferably 3 to 9 percent, by weight of a diene type rubber. Preferably, the rubber is grafted with styrene or a styrene copolymer composition similar to that of the matrix polymer. Examples of diene rubbers used include butadiene, isoprene, chloroprene, etc. These rubber modified high impact polystyrene compositions are well known in the prior art and need no further description here.

B. Fire Retardant Additives

The fire retardant additives which are used with polymeric compositions are generally well known to those skilled in the art. These additives contain a halogen, phosphorous or sulfur in order to obtain fire retardancy. The preferred additives are those which contain one or more bromine or chlorine atoms such as aromatic bromine compounds, brominated furan-maleic-anhydride adducts, 4-bromoalkyl or tribromo neopentyl esters, chlorinated cyclopentadiene and derivatives thereof, etc. One such class of these compounds may be represented by the following general formula:

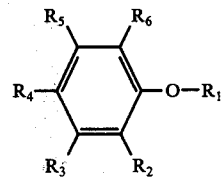

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine, and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether, octabromodiphenylether and decabromodiphenyl ether. The halogen atoms of these diaromatic ethers may be distributed in any arrangement on the aromatic rings.

Examples of suitable aromatic-aliphatic ethers are the 2-ethylhexyl-, n-octyl, nonyl-, butyl-, and dodecyl- and 2,3-dioxopropyl ethers of tribromophenyl, tribromochlorophenyl and tribromodichlorophenyl. The most preferred compound is decabromodiphenyl ether. Other aromatic bromine compounds are described in U.S. Pat. Nos. 3,833,538, 3,849,369, British Pat. No. 1,372,120 and West German Patent Publications Nos. 2,328,517, 2,328,520 and 2,328,535, which are incorporated herein by reference. Other suitable aromatic halogen compounds are well known to those skilled in the art or will become obvious upon reading the present specification.

The amount of brominated fire retardant additives used is selected to provide a bromine content in the range of from 4 to 15 percent bromine by weight, preferably 6 to 10 percent bromine by weight in order to provide sufficient bromine to the composition in order to obtain the desired degree of flame retardancy. When using the relatively less efficient chlorinated additives, the amounts are increased to provide 8 to 20 percent of chlorine, preferably 10 to 15 percent of chlorine to the molding composition.

A metal oxide is used in combination with the halogen additive described above in order to obtain improved fire retardant properties. Examples of such metal oxides include $Sb_2O_3$, $Bi_2O_3$, $MoO_3$, $SnO_2$, $WO_3$, and the like. The preferred metal oxide is $Sb_2O_3$. These metal oxides (especially antimony oxide) function as synergists in improving the efficiency of the halogen additive in imparting flame retardancy to the above mentioned polymers. The amount of metal oxide used is in the range of from 3 to 15 percent by weight, preferably 4 to 12 percent by weight, based on the total weight of the formulated composition.

C. Additional Rubber Components

In addition to the grafted rubber component used to modify the polystyrene composition, a second rubber component may optionally be used in the processes of the present invention. The purpose of such rubber is to improve impact strength and to help disperse the metal oxide component during the intensive mixing step. In addition, the second rubber component may help to control dripping of the polyblend under flaming conditions.

The second rubber component is preferably a block copolymer or a graft copolymer or heterogeneous polymer that may act as a block copolymer. Especially preferred are styrene-butadiene (S-B) copolymers which as SBS or SB block copolymers. Also suitable are lightly grafted polymers (5 to 30% graft) which have a high swelling index, which can provide a link between the matrix polymer and the rubber. The swelling index of such blends should be greater than 7 and preferably greater than 10. Examples of these lightly grafted polymers include polychloroprene and polybutadiene which have been grafted with a superstrate which is similar in composition to the matrix polymer component used in the polyblend.

The amount of the second rubber component used is in the range of 1 to 8 percent, preferable 2 to 6 percent based on the total weight of the polyblend composition.

PROCESS STEPS

According to the processes of the present invention the metal oxide component is blended with a minor amount of styrenic polymer component and optionally one of the rubber components. The blend is then subjected to high intensity mixing and heated at or above the fusion temperature of the styrenic polymer component but below the decomposition or degradation temperature of the polymer component. The preferred temperatures at which the polymer is heated are in the range of from 150° to 300° C., preferably 160° to 230° C.

High intensity mixing of the heated blend may be obtained using conventional high intensity mixers such as Banbury mixers, roll mills, Pfaudler mixers, continuous intensive mixers, twin screw extruders, etc. Several such mixers are described in Section 19, pages 1 to 26 of Peng and Chilton CHEMICAL MIXERS HANDBOOK, 5th Edition, McGraw-Hill (1973). Mixing is continued until the metal oxide is uniformly dispersed throughout the molten polymer. When using a Banbury mixer as in the working examples below, the mixing time required is about 1 to 6 minutes, preferably 2 to 4 minutes after fusion of the polymer component occurs.

The blend is then comminuted to the desired particle size using pelletizers, dicers, knives, grinders, choppers, and the like. The comminuted particles are then blended with the other ingredients used to prepare the polyblend compositions. These ingredients include the balance of the styrene matrix polymer, the grafted diene rubber which is used to modify the styrene matrix polymer, the second rubber component, the halogen fire retardant additive, lubricants, stabilizers and other such additives.

The polystyrene-metal oxide dispersion and the other components of the molding composition are then uniformly mixed using conventional mixers such as tumblers, drums, rotary mixers, conical blenders, Kenics blender, ribbon blenders and the like. The blended ingredients are then compounded at temperatures in the range of from 255° to 300° C., preferably 260° to 290° C. The temperatures referred to above are the stock temperatures of the polyblend. The impact strength of molded test specimens increases with increasing compounding temperatures in the preferred range. However, care must be taken to insure that the ingredients of the polyblend will not be subject to degradation or decomposition at these compounding temperatures.

The ingredients that form the molding composition are compounded by heating and mixing. The compounding is carried out in extruders, Banbury mixers, mill rolls, Farrell continuous mixers and the like. The preferred compounding method is in an extruder.

The compounded material is then comminuted to the desired size using the methods described above to form the molding composition.

The following examples are set forth in illustration of the present invention and are not to be construed as a limitation thereof. Unless otherwise indicated, all parts and percentages are by weight.

EXAMPLES 1 to 8

These examples illustrate the unexpected retention of impact strength that is obtained when using the processes of the present invention to compound the ingredients of the fire retardant polyblend.

Various polymeric formulations are prepared from a rubber modified high impact polystyrene (HIPS), a block rubber component, antimony oxide and decabromodiphenyl ether. The polystyrene used is a homopolymer with a Staudinger weight average molecular weight (Mw) of about 320,000. The rubber modifier for the polystyrene is a butadiene rubber (substrate) which has been grafted with a styrene monomer (superstrate). The amount of butadiene rubber substrate in the final blend is in the range of from 5.5 to 8.0 percent by weight (ungrafted basis) based on the total weight of the molding composition. The block rubber component used is a block copolymer of styrene and butadiene which contains about 30 percent by weight of styrene and 70 percent by weight of butadiene based on the total weight of the block rubber. The amount of block rubber used is varied from 0 to 5 percent by weight based on the total weight of the polyblend. The block rubber used is available commercially as Kraton 1101 from Shell Chemical Company, Polymers Division.

The test samples are prepared by filling the chamber of a warm (120° C.) Banbury mixer with one of the following charges:

|  | Charge I | Charge II | Charge III |
|---|---|---|---|
|  |  |  | Control Samples |
| Antimony oxide | 43 parts | 40 parts | — |
| Block rubber | 30 parts | — | 30 parts |
| Polystyrene | 27 parts | 60 parts | 70 parts |

The temperature of the ingredients is raised to the fusion temperature of the polystyrene (about 160° C.) by the friction generated during operation of the mixer. The batch is continuously mixed under high shear for an additional 2 minutes and then discharged and comminuted by sheeting out between a set of heated mill rolls with temperatures of 165° C. and then comminuted by grinding.

The comminuted material is then blended in a rotary blender with a diluent which comprises the balance of the polystyrene matrix polymer, the grafted butadiene rubber which is used as a high impact modifier for the polystyrene, the fire retardant additive, lubricant, stabilizer and any other planned ingredient which is not incorporated in the intensive mixing operation. The weight ratio of the diluent to the comminuted material is 9/1. The blended material is then extruded at a stock temperature of either 282° or 255° C. as measured at the outlet of the extruder. The extruded material is then comminuted to form a molding composition.

The resulting material is then tested for impact strength using the Falling Dart Impact (FDI) test described in U.S. Pat. No. 3,563,845 which is incorporated herein by reference. The FDI test is conducted at 23° C. (73° F.)

The compositions of the polymeric formulations tested are set forth below:

| Ingredients | % by weight |
|---|---|
| Polystyrene[1] | 80.1 – 72.6 |
| Amount of Grafted Rubber[2] | 5.5 – 8.0 |
| Block rubber | 0 to 5 |
| Antimony oxide | 4.3 |
| Decabromodiphenyl ether | 10.0 |
| Lubricant | 0.2 |
| Stabilizer | 0.2 |

[1]Total as matrix polymer and as graft superstrate onto butadiene rubber.
[2]5.5 to 8.0 percent by weight butadiene rubber (ungrafted basis).

The FDI test results on the above samples are tabulated in Table I below.

TABLE I

SUMMARY OF EXAMPLES 1 to 8

| Example | Temp. (1) ° C. | Grafted Rubber(2) | Block Rubber(3) | F.D.I. Values Control Samples(4) | F.D.I. Values Test Samples(5) |
|---|---|---|---|---|---|
| 1 | 282 | 5.5 | 5 | 6.4 | 9.1 |
| 2 | 282 | 6.5 | 3 | 9.1 | 17.4 |
| 3 | 282 | 8.0 | 0 | 8.1 | 10.2 |
| 4 | 282 | 8.0 | 5 | 11.5 | — |
| 5 | 282 | 8.0 | 3 | 12.0 | — |
| 6 | 255 | 5.5 | 5 | 3.8 | 5.3 |
| 7 | 255 | 6.5 | 3 | 3.7 | 7.3 |
| 8 | 255 | 8.0 | 0 | 4.0 | 4.5 |

(1)Temperature is stock temperature of melt as measured at the die outlet of the extruder.
(2)Percent by weight of butadiene rubber (ungrafted basis) based on total weight of the polyblend.
(3)Percent by weight based on total weight of the polyblend.
(4)The control samples are prepared using Charge III above. The antimony oxide is added to the rotary blender and not subjected to intensive mixing with the matrix polymer.
(5)Examples 3 and 8 are prepared using Charge II above. Examples 1, 2, 6 and 7 are prepared using Charge I above.

Referring to Table I above, a comparison of the FDI values of control samples and test samples readily indicates the superior impact strength which is obtained with the process steps of the present invention wherein the antimony oxide is first blended with a minor proportion of the polystyrene component and all of the block rubber components in a high intensity mixer. It should also be noted that the FDI values are higher for those samples extruded at 282° C. which illustrates the advantage of higher compounding temperatures.

EXAMPLES 9 to 12

These examples illustrate that the retention of impact strength can be obtained by intensely mixing only the polystyrene component and the antimony oxide component to form a concentrate dispersion which is then blended with a diluent. Two sets of examples are prepared. In the first set the antimony oxide and block rubber are subjected to intensive mixing in a Banbury as described above. In the second set the antimony oxide and a small portion of the polystyrene are subjected to intensive mixing in a Banbury as described above. The block rubber is subjected to intensive mixing in a Banbury as described above and then blended with other ingredients. All of the samples are extruded at 282° C. and tested as outlined above.

The compositions of the polymeric formulations tested are set forth below:

| Ingredients | % by weight |
|---|---|
| Polystyrene (1) | 72.6 – 74.6 |
| Amount of grafted rubber (2) | 8 |
| Block rubber | 3 or 5 |
| Antimony oxide | 4.3 |

-continued

| Ingredients | % by weight |
| --- | --- |
| Decabromodiphenyl ether | 10.0 |
| Lubricant | 0.2 |
| Stabulizer | 0.2 |

(1) Total matrix polymer and as graft superstrate onto butadiene rubber.
(2) Contain from 5.5 to 8.0 percent by weight butadiene rubber (ungrafted basis).

TABLE II
SUMMARY OF EXAMPLES 9 to 12

| Example | | Block Rubber | F.D.I. Values |
| --- | --- | --- | --- |
| 9 | $Sb_2O_3$/Block Rubber | 3 | 16.2 |
| 10 | $Sb_2O_3$/Polystyrene Matrix | 3 | 17.5 |
| 11 | $Sb_2O_3$/Block Rubber | 5 | 19.9 |
| 12 | $Sb_2O_3$/Polystyrene Matrix | 5 | 20.8 |

A comparison of Examples 9 and 10 and Examples 11 and 12 indicate that the retention of impact strength can be obtained by blending the antimony oxide with the polystyrene matrix component or with the block rubber component.

EXAMPLES 13 and 14

Example 2 is repeated here except that the block rubber used in Example 2 is replaced by a polychloroprene rubber (Example 13) and a polybutadiene rubber (Example 14). The polychloroprene rubber used is Chloroprene W which is available commercially from duPont and the polybutadiene rubber used is Diene 55 which is available commercially from Firestone Rubber Company. The falling Dart Impact test results of 9.8 and 6.4 are obtained for the polychloroprene and polybutadiene samples. A control sample, which is a repeat of Example 2, had a Falling Dart Impact value of 13.6. This illustrates the superiority of the block rubbers over either ungrafted polychloroprene or ungrafted polybutadiene and some of the variability experienced in the Falling Dart Impact test. Higher FDI values would be expected when using polychloroprene or polybutadiene which has been grafted with small amounts of a polystyrene superstrate.

The molding compositions which are prepared by the processes of the present invention are useful for preparing a wide variety of molded objects such as radio and television cabinets, appliance housings, parts and components for vehicles, furniture and other related items. They may also be used to produce film, sheet, foamed and thermoformed objects.

Polyblends of the present invention may be further modified with conventional additives and adjuvants such as fillers, plasticizers, U.V. stabilizers, heat stabilizers, antioxidants, etc. Care should be taken when formulating or compounding the polyblends of the present invention so as not to adversely effect the desired properties of the polyblend of the present invention.

What is claimed is:

1. An improved process for compounding fire retardant polystyrene compositions, which comprise a polystyrene component, a metal oxide and a fire retardant halogen additive which method comprises:
    A. mixing the metal oxide with a minor amount of the polystyrene component;
    B. subjecting the mixture to high intensity mixing at or above the fusion temperature of the polystyrene for a time sufficient to uniformly disperse the metal oxide in the molten polystyrene;
    C. comminuting the polystyrene-metal oxide mixture obtained in Step B above;
    D. blending the comminuted polystyrene-metal oxide mixture with the other ingredients of the composition;
    E. compounding the blend from (D) above at temperatures above 255° C. and below the temperature at which degradation occurs; and
    F. comminuting the compounded blend.

2. A process as in claim 1 wherein the polystyrene is modified with a diene rubber which has been grafted with a polystyrene superstrate.

3. A process as in claim 2 wherein the composition further contains a second rubber component which is a block copolymer.

4. A process as in claim 1 wherein the intensive mixing of the polystyrene component and the metal oxide is carried out at a temperature in the range of from 150° to 300° C.

5. A process as in claim 1 wherein the blend is extruded at a temperature in the range of from 260° to 290° C.

6. An improved method for compounding fire retardant polystyrene compositions, which comprise a polystyrene component, antimony oxide and a fire retardant halogen additive which method comprises:
    A. mixing the antimony oxide with a minor amount of the polystyrene component;
    B. subjecting the mixture to high intensity mixing at a temperature in the range of from 160° to 230° C. for a time sufficient to uniformly disperse the antimony oxide in the molten polystyrene;
    C. comminuting the mixture obtained in Step B above;
    D. blending the comminuted polystyrene-antimony oxide mixture with the other ingredients of the composition;
    E. extruding the blend from (D) above at temperatures in the range of from 260° to 290° C.; and
    F. comminuting the extruded blend.

7. A process as in claim 6 wherein the polystyrene matrix is modified with a butadiene rubber which has been grafted with a polystyrene superstrate.

8. A process as in claim 7 wherein the composition further contains a second rubber component which is a styrene butadiene block copolymer.

9. A process as in claim 7 wherein the composition further contains a second rubber component which is a polychloroprene rubber.

* * * * *